(12) United States Patent
McDermott et al.

(10) Patent No.: US 10,668,329 B2
(45) Date of Patent: Jun. 2, 2020

(54) GOLF BALLS HAVING LAYERS MADE FROM TELECHELIC IONOMER COMPOSITIONS

(71) Applicant: Acushnet Company, Fairhaven, MA (US)

(72) Inventors: Erin C. McDermott, Providence, RI (US); Brian Comeau, Berkley, MA (US); Michael J. Sullivan, Old Lyme, CT (US); Mark L. Binette, Mattapoisett, MA (US)

(73) Assignee: Acushnet Company, Fairhaven, MA (US)

( * ) Notice: Subject to any disclaimer, the term of this patent is extended or adjusted under 35 U.S.C. 154(b) by 4 days.

(21) Appl. No.: 15/878,696

(22) Filed: Jan. 24, 2018

(65) Prior Publication Data

US 2019/0224531 A1  Jul. 25, 2019

(51) Int. Cl.
| | |
|---|---|
| *A63B 37/04* | (2006.01) |
| *A63B 37/00* | (2006.01) |
| *A63B 45/00* | (2006.01) |
| *B32B 25/04* | (2006.01) |

(52) U.S. Cl.
CPC ...... *A63B 37/0075* (2013.01); *A63B 37/0023* (2013.01); *A63B 37/0033* (2013.01); *A63B 37/0039* (2013.01); *A63B 37/0043* (2013.01); *A63B 37/0044* (2013.01); *A63B 37/0059* (2013.01); *A63B 37/0062* (2013.01); *A63B 37/0063* (2013.01); *A63B 37/0064* (2013.01); *A63B 37/0074* (2013.01); *A63B 37/0076* (2013.01); *A63B 37/0078* (2013.01); *A63B 37/0087* (2013.01); *A63B 37/0092* (2013.01); *A63B 45/00* (2013.01); *B32B 25/04* (2013.01); *B32B 2307/536* (2013.01)

(58) Field of Classification Search
None
See application file for complete search history.

(56) References Cited

U.S. PATENT DOCUMENTS

| | | | | |
|---|---|---|---|---|
| 5,697,856 | A * | 12/1997 | Moriyama | A63B 37/0003 473/374 |
| 6,194,505 | B1 * | 2/2001 | Sone | C08C 19/44 473/371 |
| 7,226,367 | B2 * | 6/2007 | Higuchi | A63B 37/0003 473/373 |
| 7,683,128 | B2 | 3/2010 | Tarao et al. | |
| 2012/0157236 | A1 * | 6/2012 | Sullivan | A63B 37/0031 473/376 |
| 2015/0005108 | A1 * | 1/2015 | Sullivan | A63B 37/0043 473/376 |
| 2016/0333140 | A1 | 11/2016 | Martinez et al. | |

* cited by examiner

*Primary Examiner* — David J Buttner
(74) *Attorney, Agent, or Firm* — Mandi B. Milbank (57) ABSTRACT

Golf balls comprising a core having at least one layer and a cover having at least one layer are provided. At least one of the layers is made from a thermoplastic composition preferably comprising a telechelic ionomer derived from alkyl-cis-cyclooctene and cis-cyclooctene. The telechelic ionomer composition also may be used to form intermediate layers. Blends of telechelic ionomers and polybutadiene rubbers or ethylene acid copolymers can be prepared. The telechelic ionomer compositions can be used to make a cover layer having good impact durability and shear resistance and that also helps provide the ball with high resiliency.

9 Claims, 2 Drawing Sheets

GOLF BALLS HAVING LAYERS MADE FROM TELECHELIC IONOMER COMPOSITIONS

BACKGROUND OF THE INVENTION

Field of the Invention

The present invention relates generally to multi-piece golf balls comprising a core having at least one layer and a cover having at least one layer. At least one of the layers is made from a thermoplastic composition preferably comprising a telechelic ionomer derived from alkyl-cis-cyclooctene and cis-cyclooctene.

Brief Review of the Related Art

Multi-layered, solid golf balls are used today by recreational and professional golfers. In general, these golf balls contain an inner core protected by a cover. The core acts as the primary engine for the ball and the cover protects the core and helps provide the ball with durability and wear-resistance. The core and cover may be single or multi-layered. For example, three-piece golf balls having an inner core, inner cover layer, and outer cover layer are popular. In other instances, golfers will use a four-piece ball containing a dual-core (inner core and surrounding outer-core layer) and dual-cover (inner cover layer and surrounding outer cover layer). Intermediate layer(s) may be disposed between the core and cover layers to impart various properties. Thus, five-piece and even six-piece balls can be made.

Normally, the core layers are made of a natural or synthetic rubber material or an acid copolymer ionomer. These ionomer polymers are typically copolymers of ethylene and methacrylic acid or acrylic acid that are partially or fully-neutralized. Metal ions such as sodium, lithium, zinc, and magnesium are commonly used to neutralize the acid groups in the copolymer. The acid groups may be partially-neutralized (where typically, about 10 to 70% of the acid groups are neutralized) or highly-neutralized (where typically, greater than 70% of the acid groups are neutralized.) In addition to being used as a core material, these acid copolymer ionomers may be used to make intermediate and cover layers for the golf ball. Such ionomer resins generally have good durability and toughness. When used as a core material, the ionomer resin helps impart a higher initial velocity to the golf ball. When used as a cover material, the ionomer resin helps impart impact durability, wear-resistance, and cut/shear-resistance to the golf ball.

As noted above, in recent years, three-piece and four-piece balls have become more popular. New manufacturing technologies, lower material costs, and desirable playing performance properties have contributed to these multi-piece balls becoming more popular. Many golf balls used today have multi-layered cores comprising an inner core and at least one surrounding outer core or intermediate layer. For example, the inner core may be made of a relatively soft and resilient material, while the outer core or intermediate layer may be made of a harder and more rigid material. This ball "sub-assembly" is encapsulated by a cover of at least one layer to provide a final ball assembly. Different materials can be used to manufacture the cover including, for example, polyurethanes; polyureas; copolymers, blends and hybrids of polyurethane and polyurea; and olefin-based copolymer ionomer resins such as Surlyn® ethylene acid copolymer ionomer resins.

Manufacturers of golf balls are constantly looking to different materials and ball constructions for improving the playing performance and other properties of the ball. For example, hard and durable materials having a relatively high flex modulus can be used to make a relatively hard core. The resulting golf ball tends to travel a long distance because of the high velocity imparted by the hard core. However, one disadvantage with these harder balls is they tend to provide the golfer with a rougher and harder "feel." Thus, the player may experience a more uncomfortable and unnatural sensation as the club face makes impact with the ball. Moreover, the player tends to have less control when hitting relatively hard balls. It generally is more difficult to hit hard balls with the proper touch and spin.

To address these problems, golf ball manufacturers have looked at different materials for golf ball constructions. For example, Taro et al., US Patent Application Publication 2007/0161752 discloses making cover and intermediate layers in a golf ball with a telechelic ionomer composition comprising, a binary copolymer obtained by copolymerizing an olefin monomer having 2 to 8 carbon atoms and an unsaturated monomer having an acid functional group. Also, ternary copolymers obtained by copolymerizing an olefin monomer having 2 to 8 carbon atoms, an unsaturated monomer having an acid functional group and an unsaturated carboxylic acid ester, wherein functional groups are introduced into both terminals of the copolymer (the binary copolymer and/or the ternary copolymer) can be prepared.

Although some ionomeric compositions as mentioned above may be somewhat effective for making certain components of a golf ball, there is still a need for new compositions that can impart high performance properties to the ball. Particularly, there is a continuing need for improved cover constructions in golf balls. The cover material should have good impact durability, toughness, and cut/shear-resistance, while helping to provide the ball with high resiliency. The cover material, however, should not be excessively hard and stiff so that properties such as feel, softness, and spin control are sacrificed. The present invention provides golf balls having an optimum combination of properties.

SUMMARY OF THE INVENTION

The present invention generally relates to multi-layered golf balls and more particularly to golf balls having at least one layer made of a thermoplastic telechelic ionomer composition. Preferably, the telechelic ionomer is cis-cyclooctene-based and more preferably is formed by reacting alkyl-cis-cyclooctene and cis-cyclooctene. In one version, the ball comprises an inner core and outer core layer. The inner core is formed from a blend of: a) telechelic ionomer, and b) polybutadiene rubber. Preferably, the telechelic ionomer is present in an amount in the range of about 5 to about 50 weight percent. The surrounding outer core layer comprises a thermoplastic or thermoset composition, for example, an ethylene acid copolymer-based ionomer or polybutadiene rubber.

In one embodiment, the inner core and outer core layer each has a positive hardness gradient. In a second embodiment, the inner core has a zero or negative hardness gradient and the outer core layer has a positive hardness gradient. In yet another embodiment, the inner core has a positive hardness gradient and the outer core layer has a zero or negative hardness gradient. In one example, the inner core has a diameter in the range of about 0.500 to about 1.500 inches and the center hardness of the inner core ($H_{inner\ core\ center}$) is in the range of about 10 Shore C to about 70 Shore C and the inner core surface hardness ($H_{inner\ core\ surface}$) is in the range of about 15 Shore C to about 90 Shore C to provide a positive hardness gradient. In one example, midpoint hardness of the outer core the ($H_{midpoint\ of\ OC}$) is in the range of about 20 Shore C to about 85 Shore C and the outer surface hardness of the outer core ($H_{outer\ surface\ of\ OC}$) is in the range of about 30 Shore C to about 95 Shore C to provide a positive hardness gradient. In one example, the center hardness of the inner core ($H_{inner\ core\ center}$) is in the range of about 30 Shore C to about 650 Shore C and the outer surface hardness of the outer core layer ($H_{outer\ surface\ of\ OC}$) is in the range of about 40 Shore C to about 90 Shore C to provide a positive hardness gradient across the core assembly.

Thermoplastic compositions that can be used to form the outer core layer or other layers in accordance with this invention include compositions comprising an ethylene acid copolymer containing acid groups such that greater than 70% of the acid groups, and more preferably greater than 90%, are neutralized. For example, copolymer such as ethylene/(meth)acrylic acid/n-butyl acrylate; ethylene/(meth)acrylic acid/ethyl acrylate; ethylene/(meth)acrylic acid/methyl acrylate; ethylene/(meth)acrylic acid/isobutyl acrylate; and ethylene/(meth)acrylic acid copolymers; and blends thereof may be used. Preferred thermoset rubber compositions include rubbers such as polybutadiene, polyisoprene, ethylene-propylene, ethylene-propylene-diene, styrene-butadiene, and polyalkenamer, and mixtures thereof.

The thermoplastic telechelic-ionomer based compositions of this invention may be used to form one or more core, intermediate, or cover layers. These compositions have a good combination of properties including Coefficient of Restitution (CoR) and compression so they can be used to make various golf ball layers. For example, balls having a compression in the range of about 25 to about 110 can be made. In one embodiment, balls having a relatively low compression, for example, in the range of about 25 to about 75, can be made.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Golf balls having various constructions may be made in accordance with this invention. For example, golf balls having one-piece, two-piece, three-piece, four-piece, and five or more-piece constructions with the term "piece" referring to any core, cover or intermediate layer of a golf ball construction. Representative illustrations of such golf ball constructions are provided and discussed further below. The term, "layer" as used herein means generally any spherical portion of the golf ball. More particularly, in one version, a one-piece ball is made using the inventive composition as the entire golf ball excluding any paint or coating and indicia applied thereon. In a second version, a two-piece ball comprising a single core and a single cover layer is made. In a third version, a three-piece golf ball containing a dual-layered core and single-layered cover is made. The dual-core includes an inner core (center) and surrounding outer core layer. In another version, a three-piece ball containing a single core layer and two cover layers is made. In yet another version, a four-piece golf ball containing a dual-core and dual-cover (inner cover and outer cover layers) is made. In yet another construction, a four-piece or five-piece golf ball containing a dual-core; an intermediate layer, an inner cover layer, and an outer cover layer, may be made. In still another construction, a five-piece ball is made containing an innermost core layer (or center), an intermediate core layer, an outer core layer, an inner cover layer and an outer cover layer. The diameter and thickness of the different layers along with properties such as hardness and compression may vary depending upon the construction and desired playing performance properties of the golf ball. Any one or more of the layers of any of the one, two, three, four, or five, or more-piece (layered) balls described above may comprise the thermoplastic telechelic ionomer composition as disclosed herein. That is, any of the inner (center) core and/or outer core layers, and/or inner, intermediate, or outer cover layers may comprise the thermoplastic telechelic ionomer composition of this invention.

Also, when more than one thermoplastic telechelic ionomer layer is used in the golf ball, the thermoplastic compositions in the respective layers may be the same or different, and the compositions may have the same or different hardness values. For example, a dual-core assembly may be made, wherein the inner core comprises a first thermoplastic composition, and the outer core layer comprises a second thermoplastic composition. The first and second compositions may be the same, or the respective compositions may be different. For instance, the telechelic ionomer composition of this invention may be used in one or both core layers. Likewise, when more than one thermoset layer is used in the golf ball, the thermoset composition in the respective layers may be the same or different, and the composition may have the same or different hardness values. Furthermore, in some examples, the thermoplastic material in a particular thermoplastic layer may constitute two, three, or more "sub-layers" of the same or different thermoplastic composition. That is, each thermoplastic layer can be formed from one or more sub-layers of the same or different thermoplastic material. In such instances, the thermoplastic layer can be considered a composite layer made of multiple independent and distinct component layers. Preferably, at least one of the component layers comprises the thermoplastic telechelic ionomer composition of this invention.

In random ionomers such as partially sulfonated polystyrene (SPS) (sodium salt), ionic groups are randomly distributed along backbone chains. In contrast, in telechelic ionomers, ionic groups are located only at the chain ends: monotelechelic ionomers have only one ionic group at the chain end of a linear chain; ditelechelic ionomers have two ionic groups at the chain ends of a linear chain; and trichelic ionomers have ionic groups at the chain ends of three-arm star polymers, and the like.

Random Ionomers

Traditional ionomers that are often used in golf ball constructions are typically copolymers of an α-olefin and a $C_3$-$C_8$ α,β-ethylenically unsaturated carboxylic acid with an optional softening monomer. These acid copolymers are normally reacted with a sufficient amount of cation source such that at least 70% and more typically at least 90% of all acid groups present are neutralized to form the ionomer.

Normally, an ionomer is made by polymerizing a monomer containing a free carboxylic acid group and α-olefin; and neutralizing at least some of the acid groups with a metal cation. For example, ethylene and methacrylic acid first may be reacted to form the acid polymer as shown in the following diagram:

Production of Acid Polymer

Then, the ionomer may be formed through neutralization by reacting the acid polymer with a cation source (for example, a sodium or zinc cation source). For example, the acid polymer may be reacted with NaOH or $ZnCO_3$. In one example, the resulting polymer is a sodium salt as shown in the following diagram:

Production of Ionomer

The telechelic ionomers differ from the above-described random ionomers as described further below.

Telechelic Ionomers

Conventional ionomers used in golf ball constructions are derived from the co-polymerization of ethylene with an unsaturated acid such as acrylic or methacrylic acid. The resulting ionomers are saturated and semi-crystalline. In contrast, the telechelic cyclooctene-based ionomers of this invention can have a wide range of crystallinity from 90% to 0% (totally amorphous). This provides a large window to control the physical properties of the telechelic ionomer to fit the particular application. Because of their low viscosity, these telechelic ionomers are also useful as melt flow modifiers in highly neutralized ionomers where conventional fatty acids and fatty acid salts would typically be used. The telechelic ionomers may also be unsaturated providing cross-linking sites to turn the thermoplastic material into a thermoset material. This is desirable when over-molding other materials that would normally exceed the melting temperature. The unsaturation also allows these ionomers to be compatible with rubber core formulations.

In accordance with the present invention, telechelic ionomers, and particularly telechelic ionomers formed by reacting alkyl-cis-cyclooctene and cis-cyclooctene, can be used in golf ball constructions to form core layers, intermediate layers, and cover layers. They can also be used as melt flow modifiers in conventional polyethylene ionomers, especially highly neutralized ionomers since the telechelic ionomers have low melt viscosity, high melt strength, and good tensile properties providing ease of molding and excellent durability. The telechelic ionomers may be saturated or unsaturated. The unsaturated versions may be cross-linked to further improve thermal stability. The amount of alkyl-cis-cyclooctene vs. cis-cyclooctene allows for the level of crystallinity to be adjusted for the particular application. Higher crystallinity can be produced when a harder cover or casing material is needed. Lower crystallinity can be produced by incorporating more alkyl-cis-cylcooctene when a softer more durable material is needed. The molecular weight of the polymer can also be controlled through the ring opening polymerization conditions. These telechelic ionomers give greater latitude in designing and developing golf ball layers due to the wide range of properties achievable.

The telechelic ionomers derived from alkyl-cis-cyclooctene and cis-cyclooctene of this invention can be produced by the methods described in Martinez et al., US Patent Application Publication 2016/0333140, the disclosure of which is incorporated by reference.

One embodiment for making the telechelic ionomer of this invention involves producing a polyolefin difunctional acid reactive telechelic pre-polymer. This process comprises reacting alkyl-cis-cyclooctene and cis-cyclooctene in a mole ratio from 0:1 to 1:0 in the presence of a difunctional acidic chain transfer agent under ring opening metathesis polymerization conditions to form an unsaturated polyolefin reactive dicarboxylic acid telechelic pre-polymer; hydrogenating the unsaturated polyolefin reactive dicarboxylic acid telechelic pre-polymer to produce a hydrogenated polyolefin reactive dicarboxylic, telechelic pre-polymer; reacting the hydrogenated polyolefin reactive telechelic pre-polymer with at least one compound according to the formula $aM^xb(R)^y$, wherein M is a metal, x is a charge of M, R is alkyl, aryl, oxide, or fatty acid, y is a charge of R, a and b are integers of at least 1, and $ax+by=0$, to form an ionomer. Exemplary alkyl-cis-cyclooctenes include 3-substituted-cis-cyclooctenes, such as 3-methyl-cis-cyclooctene, 3-ethyl-cis-cyclooctene, 3-hexyl-cis-cyclooctene, and 3-phenyl-cis-cyclooctenes. Suitable difunctional chain transfer agents include, for example, maleic acid, dicarboxylic acid, and mixtures thereof.

As discussed above, the telechelic ionomers of this invention also can be used as melt-flow modifiers in conventional polyethylene ionomer compositions, especially highly neutralized ionomer compositions, since the telechelic ionomers have low melt viscosity, high melt strength, and good tensile properties providing ease of molding and excellent durability.

The thermoplastic telechelic ionomer compositions of the present invention optionally include additive(s) and/or filler(s) in an amount within a range having a lower limit of 0 or 5 or 10 wt %, and an upper limit of 15 or 20 or 25 or 30 or 50 wt %, based on the total weight of the composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, rubber core regrind (recycled material), and mixtures thereof.

Core Structure

In one preferred embodiment, the core is made from the thermoplastic telechelic ionomer composition of this invention. A dual core structure having an inner core and surrounding outer core layer can be made. In one embodiment, the thermoplastic telechelic ionomer composition of this invention can be used to make the inner core, while the outer core layer is formed from a suitable thermoset or thermoplastic composition. In an alternate embodiment, the thermoplastic telechelic ionomer composition of this invention can be used to make the outer core, while the inner core layer is formed from a suitable thermoset or thermoplastic composition as described further below.

As discussed above, the telechelic ionomers derived from alkyl-cis-cyclooctene and cis-cyclooctene of this invention can be used to make a core layer. Also, conventional thermoset and thermoplastic compositions can be used to make a core layer in accordance with this invention. Suitable thermoset materials that may be used to form a core layer include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA).

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (ZnPCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber composition also may include filler(s) such as materials selected from carbon black, nanoclays (e.g., Cloisite® and Nanofil® nanoclays, commercially available from Southern Clay Products, Inc., and Nanomax® and Nanomer® nanoclays, commercially available from Nanocor, Inc.), talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed.

In addition, the rubber compositions may include antioxidants to prevent the breakdown of the elastomers. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.) Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art may be added to the rubber composition.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

Suitable thermoplastic materials that can be used to form a core layer in accordance with this invention include traditional O/X- and O/X/Y-type acid copolymers, wherein O is an α-olefin, X is a $C_3$-$C_8$α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. These thermoplastic acid polymers and corresponding ionomers can be plasticized or non-plasticized.

Examples of O/X and O/X/Y-type acid copolymers include, without limitation, ethylene acid copolymers, such as ethylene/(meth)acrylic acid, ethylene/(meth)acrylic acid/ maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth)acrylic acid/methyl (meth)acrylate, ethylene/(meth)acrylic acid/ethyl (meth)acrylate terpolymers, and the like. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/ or acrylate.

Thus, in one example, the inner core comprises the thermoplastic telechelic ionomer composition of this invention; and the outer core layer comprises a thermoset material such as rubber or a thermoplastic material as described above. In a second example, the inner core comprises the thermoplastic telechelic ionomer composition of this invention; and the outer core layer comprises a second thermoplastic composition. The second thermoplastic composition may have the same or different formulation as the telechelic ionomer composition used to make the inner core. In one embodiment, the second thermoplastic composition comprises an acid polymer and more preferably is an O/X/Y or O/X acid polymer as described above. In a further example, the inner core comprises the second thermoplastic composition and the outer core comprises the telechelic ionomer composition of this invention. In a further example, the inner core may be formed from a thermoset rubber and the outer core layer may be formed from the telechelic ionomer composition of this invention.

In yet another example, a three-layered core is made. For example, a core assembly having inner and outer core layers, wherein an intermediate core layer is disposed between the two core layers, may be prepared. In such a construction, the thermoplastic telechelic ionomer composition of this invention may be used to form at least one of the inner, intermediate, and outer core layers.

Diameter and Hardness of Core and Intermediate Layer Structure

The inner core preferably has a diameter in the range of about 0.100 to about 1.600 inches. For example, the inner core may have a diameter within a range of about 1.400 inches to about 1.580 inches. In another example, the inner core may have a diameter within a range of about 0.400 to about 1.400 inches. As far as the intermediate layer is concerned, it preferably has a thickness in the range of about 0.100 to about 0.750 inches. For example, the intermediate layer can have a thickness of about 0.15 to about 0.40 inches.

Golf balls made in accordance with this invention can be of any size, although the USGA requires that golf balls used in competition have a diameter of at least 1.68 inches. For play outside of USGA rules, the golf balls can be of a smaller size. Normally, golf balls are manufactured in accordance with USGA requirements and have a diameter in the range of about 1.68 to about 1.80 inches. There is no upper size limit so some golf balls, if desired, can be made having an overall diameter greater than 1.80 inches, for example, 1.90 or 2.10, or even greater. Preferably, the golf ball diameter is about 1.68 to 1.74 inches, more preferably about 1.68 to 1.70 inches. As discussed above, the golf ball contains a cover that may be multi-layered and also may contain intermediate layers, so the thickness levels of these layers also must be considered. In general, the dual-core structure has an overall diameter within a range having a lower limit of about 1.00 or 1.20 or 1.30 or 1.40 inches and an upper limit of about 1.55 or 1.58 or 1.60 or 1.63 or 1.65 inches. In one embodiment, the diameter of the core sub-assembly is in the range of about 1.20 to about 1.60 inches. In another embodiment, the core sub-assembly has a diameter in the range of about 1.30 to about 1.58 inches, and in yet another version, the core diameter is about 1.40 to about 1.55 inches.

In general, hardness gradients are described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the intermediate layer) and radially inward towards the center of the inner core (or inner surface or midpoint of the intermediate layer). These measurements are made typically at 2-mm increments as described in the test methods below. In general, the hardness gradient is determined by subtracting the hardness value at the innermost portion of the component being measured (for example, the center of the inner core or inner surface or midpoint of the intermediate layer) from the hardness value at the outer surface of the component being measured (for example, the outer surface of the inner core or outer surface of the intermediate layer).

Positive Hardness Gradient.

For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the intermediate layer has a greater hardness value than the inner surface (or midpoint) of the intermediate layer, the given intermediate layer will be considered to have a positive hardness gradient.

Negative Hardness Gradient.

On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the intermediate layer has a lesser hardness value than the inner surface (or midpoint) of the intermediate layer, the given intermediate layer will be considered to have a negative hardness gradient.

Zero Hardness Gradient.

In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the intermediate layer has a hardness value approximately the same as the inner surface (or midpoint) of the intermediate layer, the intermediate layer will be considered to have a zero hardness gradient.

More particularly, the term, "positive hardness gradient" as used herein means a hardness gradient of positive 1 Shore C or greater, preferably 3 or 7 Shore C or greater, more preferably 10 Shore C, and even more preferably 20 Shore C or greater. The term, "zero hardness gradient" as used herein means a hardness gradient of less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 20 Shore D or greater. For example, the ($H_{inner\ core\ center}$) may be in the range of about 20 to about 80 Shore D and more particularly within a range having a lower limit of about 20 or 22 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 78 or 80 Shore D. In another example, the center hardness of the inner core ($H_{inner\ core\ center}$), as measured in Shore C units, is preferably about 30 Shore C or greater; for example, the $H_{inner\ core\ center}$ may have a lower limit of about 30 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 or 95 Shore C.

Concerning the outer surface hardness of the inner core ($H_{inner\ core\ surface}$), this hardness is preferably about 20 Shore D or greater; for example, the $H_{inner\ core\ surface}$ may fall within a range having a lower limit of about 20 or 25 or 28 or 30 or 32 or 34 or 36 or 40 or 42 or 48 or 50 and an upper limit of about 54 or 55 or 58 or 60 or 63 or 65 or 68 or 70 or 74 or 78 or 80 or 82 or 85 Shore D. In one version, the outer surface hardness of the inner core ($H_{inner\ core\ surface}$), as measured in Shore C units, has a lower limit of about 30 or 32 or 35 or 38 or 40 or 42 Shore C and an upper limit of about 45 or 48 or 50 or 53 or 56 or 58 or 60 or 62 or 65 or 68 or 70 or 74 or 78 or 80 or 86 or 90 or 95 Shore C. In one version, the geometric center hardness ($H_{inner\ core\ center}$) is in the range of about 30 Shore C to about 95 Shore C; and the outer surface hardness of the inner core ($H_{inner\ core\ surface}$) is in the range of about 30 Shore C to about 95 Shore C.

On the other hand, the intermediate layer preferably has an outer surface hardness ($H_{outer\ surface\ of\ intermed.}$) of about 5 Shore D or greater, and more preferably within a range having a lower limit of about 5 or 10 or 12 or 15 or 18 or 20 or 24 or 30 and an upper limit of about 32 or 34 or 35 or 38 or 40 or 42 or 45 or 50 or 52 or 58 or 60 Shore D. The outer surface hardness of the intermediate layer ($H_{outer\ surface\ of\ intermed.}$), as measured in Shore C units, preferably has a lower limit of about 13 or 15 or 18 or 20 or 24 or 28 or 30 or 33 and an upper limit of about 35 or 37 or 38 or 40 or 42 or 44 or 48 or 50 or 52 or 55 or 60 Shore C.

And, the inner surface of the intermediate layer ($H_{inner\ surface\ of\ intermed.}$) or midpoint hardness of the intermediate layer ($H_{midpoint\ of\ intermed.}$), preferably has a hardness of about 4 Shore D or greater, and more preferably within a range having a lower limit of about 4 or 6 or 8 or 10 or 12 or 14 or 18 or 20 or 24 and an upper limit of about 30 or 34 or 38 or 40 or 44 or 46 or 52 Shore D. The inner surface hardness ($H_{inner\ surface\ of\ intermed.}$) or midpoint hardness ($H_{midpoint\ of\ intermed.}$) of the intermediate layer, as measured in Shore C units, preferably has a lower limit of about 10 or 12 or 14 or 17 or 20 or 22 or 24 Shore C, and an upper limit of about 28 or 30 or 35 or 38 or 40 or 42 or 45 or 48 or 52 or 55 Shore C.

The inner core/intermediate layer structure also has a hardness gradient across the entire structure. In one embodiment, the ($H_{inner\ core\ center}$) is in the range of about 30 to about 95 Shore C, preferably about 45 to about 75 Shore C; and the ($H_{outer\ surface\ of\ intermediate\ layer}$) is in the range of about 13 to about 60 Shore C, preferably about 20 to about 50 Shore C to provide a negative hardness gradient across the sub-assembly.

In another embodiment, the $H_{inner\ core\ center}$ is in the range of about 35 to about 55 Shore C and the $H_{outer\ surface\ of\ intermed.}$ is in the range of about 40 to about 60 Shore C to provide a positive hardness gradient across the sub-assembly. The gradient will vary based on several factors including, but not limited to, the dimensions of the inner core and intermediate layers.

The outer surface hardness of the intermediate layer ($H_{outer\ surface\ of\ intermed.}$), as measured in Shore A units, preferably has a lower limit of about 30 or 35 or 38 or 40 or 44 or 48 and an upper limit of about 55 or 57 or 60 or 62 or 64 or 68 or 70 or 72 or 75 or 80 or 85 or 88 or 90 or 95 or 100. The inner surface hardness ($H_{inner\ surface\ of\ intermed.}$) or midpoint hardness ($H_{midpoint\ of\ intermed.}$) of the intermediate layer, as measured in Shore A units, preferably has a lower limit of about 25 or 28 or 30 or 34 or 37 or 40 or 22 or 24 or 30 or 34 or 40 Shore A, and an upper limit of about 50 or 52 or 55 or 58 or 60 or 62 or 65 or 70 or 72 or 76 or 80 or 88 or 91 or 95 Shore A.

The midpoint of a layer is taken at a point equidistant from the inner surface and outer surface of the layer to be measured, most typically an outer core layer. Once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. In another embodiment, there is a zero or negative hardness gradient across the core assembly. For example, the center of the core ($H_{inner\ core\ center}$) may have a hardness gradient in the range of 20 to 90 Shore C; and the outer surface of the outer core may have a hardness gradient in the range of 10 to 80 Shore C. The hardness gradient across the core assembly will vary based on several factors including, but not limited to, the dimensions of the inner core, intermediate core, and outer core layers.

The United States Golf Association (USGA) has established a maximum weight of 45.93 g (1.62 ounces) for golf balls. For play outside of USGA rules, the golf balls can be heavier. Thus, in such outside of the USGA cases, the balls can have a weight greater than 1.62 ounces. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of USGA, the golf balls can be of a smaller size. Thus, in such outside of the USGA cases, the balls can have a diameter size of less than 1.68 inches. Normally, golf balls are manufactured in accordance with USGA requirements and have a diameter in the range of about 1.68 to about 1.80 inches. As discussed above, the golf ball contains a cover which may be multi-layered and in addition may contain intermediate layers, and the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core assembly is in the range of about 1.45 to about 1.62 inches.

Figure 1:
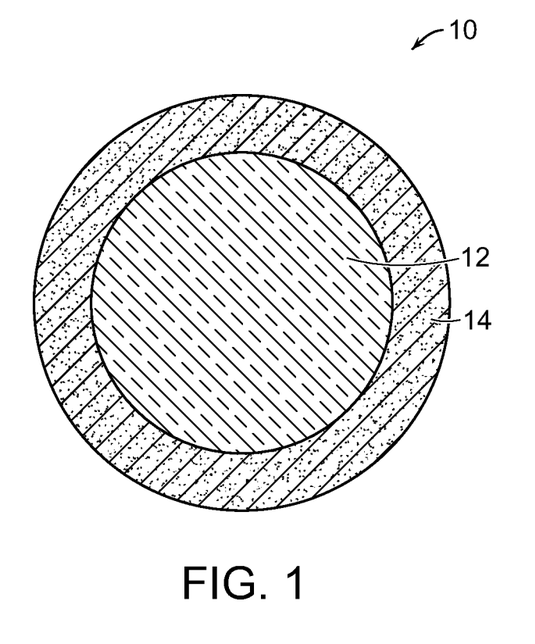
FIG. 1 is a cross-sectional view of a two-layered core for a golf ball made in accordance with the present invention.
Figure 2:
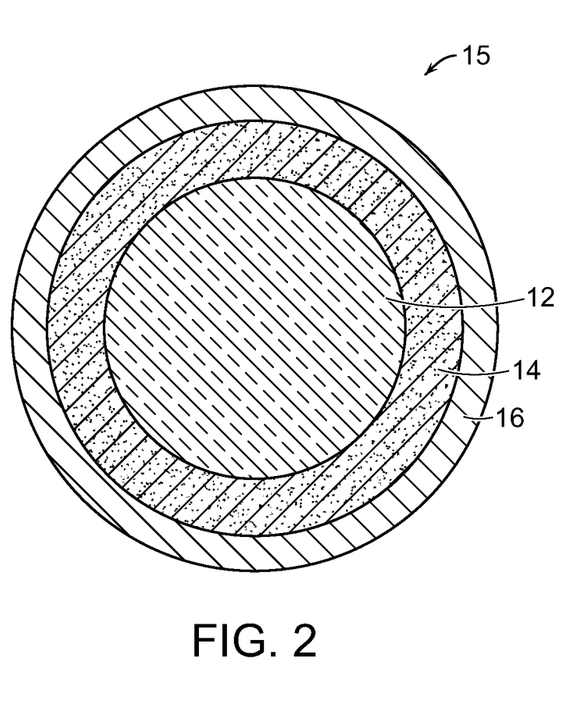
FIG. 2 is a cross-sectional view of a three-piece golf ball having a two-layered core and single-layered cover made in accordance with the present invention.
Figure 3:
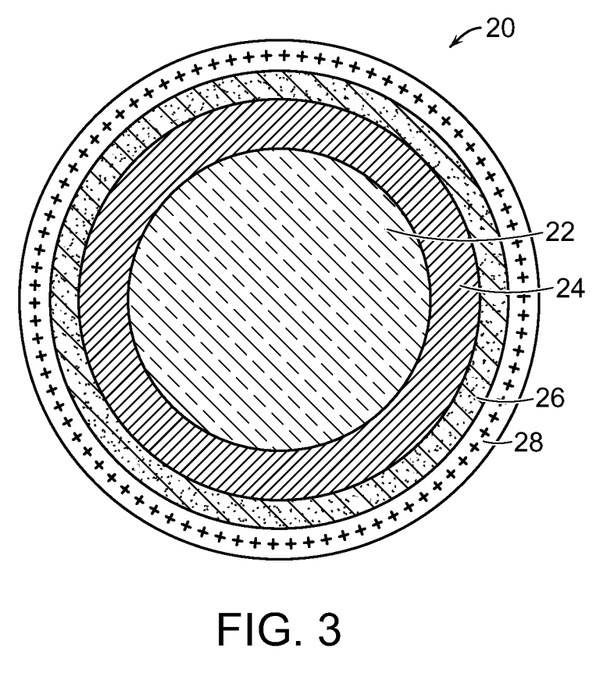
FIG. 3 is a cross-sectional view of a four-piece golf ball having a two-layered core and two-layered cover made in accordance with the present invention.
Figure 4:
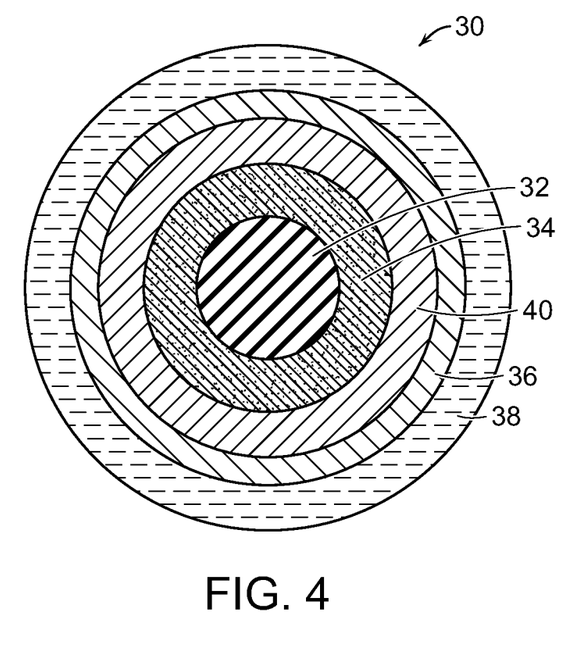
FIG. 4 is a cross-sectional view of a five-piece golf ball having a two-layered core and two-layered cover with an intermediate layer disposed between the core and cover, made in accordance with the present invention.

As discussed above, in one embodiment, the core has a dual-layered structure. As shown in FIG. 1, the core (10) includes an inner core (center) (12) comprising a thermoplastic or thermoset composition. In one embodiment, the inner core is formed from the thermoplastic telechelic ionomer composition as described above. Meanwhile, the outer core layer (14), which surrounds the inner core, comprises a thermoplastic or thermoset composition. In another embodiment, the inner core is formed from a thermoplastic or thermoset composition; and the outer core is formed from the thermoplastic telechelic ionomer composition as described above. In FIG. 2, another version of a golf ball is shown, particularly a three-piece golf ball (15) having a dual-layered core (inner core (12) and outer core layer (14)) surrounded by a single-layered cover (16). Referring to FIG. 3, in another version, the four-piece golf ball (20) contains a dual-core having an inner core (22) and outer core layer (24). The dual-core is surrounded by a multi-layered cover having an inner cover layer (26) and outer cover layer (28). Finally, in FIG. 4, the five-piece golf ball (30) contains a dual-core having an inner core (32) and outer core layer (34). The dual-core is surrounded by a multi-layered cover having an inner cover layer (36) and outer cover layer (38). An intermediate layer (40) is disposed between the core and cover sub-structures.

Different ball constructions can be made using the core constructions of this invention as shown in FIGS. 1-4 discussed above. Such golf ball constructions include, for example, four-piece, five-piece, and six-piece constructions. It should be understood the golf balls shown in FIGS. 1-4 are for illustrative purposes only, and they are not meant to be restrictive. Other golf ball constructions can be made in accordance with this invention.

Intermediate Layer Composition

In the present invention, the inner core (center) preferably comprises a thermoset or thermoplastic polymer composition. As discussed above, dual-core sub-assemblies including an inner core and outer core layer also can be made. Meanwhile, the intermediate layer, which surrounds the inner core or dual-core sub-assembly, also can be made from the thermoplastic telechelic ionomer composition of this invention.

Cover Structure

As noted above, the golf ball assembly generally comprises a core that is enclosed with a protective cover layer. The ball may contain one or more cover layers. For example, a golf ball having a single-layered cover may be made. In another version, a golf ball having a two-layered cover including inner and outer cover layers may be made. In yet another version, a three-layered cover including inner, intermediate, and outer cover layers may be made. As discussed above, the telechelic ionomers derived from alkyl-cis-cyclooctene and cis-cyclooctene of this invention can be used to make any cover layer. Also, conventional thermoset and thermoplastic compositions can be used to make a cover layer in accordance with this invention.

The cover layers of this invention provide the ball with a variety of advantageous mechanical and playing performance properties as discussed further below. In general, the hardness and thickness of the different cover layers may vary depending upon the desired ball construction. In addition, as discussed above, an intermediate layer may be disposed between the core and cover layers. The cover layers preferably have good impact durability, toughness, and wear-resistance. The telechelic ionomer composition of this invention may be used to form one or more of the cover layers.

Suitable conventional materials that can be used to form a cover layer include, but are not limited to, polyurethanes; polyureas; copolymers, blends and hybrids of polyurethane and polyurea; olefin-based copolymer ionomer resins (for example, Surlyn® ionomer resins and DuPont HPF® 1000, HPF® 2000, and HPF® 1035; and HPF® AD 1172, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly (meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable. When used as the outer cover layer material, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

In one version, the golf ball includes a multi-layered cover comprising inner and outer cover layers, wherein the inner cover layer is formed from the thermoplastic telechelic ionomer composition of this invention, and the outer cover layer is formed from a suitable thermoset or thermoplastic composition as further discussed above. In another version, the outer cover layer is formed from the thermoplastic telechelic ionomer composition of this invention, and the inner cover layer is formed from a different composition as described above. In yet another version, the thermoplastic telechelic ionomer composition of this invention may be used to form the inner and outer cover layers.

In one version, the inner cover layer hardness is about 15 Shore D or greater, more preferably about 25 Shore D or greater, and most preferably about 35 Shore D or greater. For example, the inner cover layer hardness may be in the range of about 15 to about 60 Shore D, and more preferably about 27 to about 48 Shore D. In another version, the inner cover layer hardness is about 50 Shore D or greater, preferably about 55 Shore D or greater, and most preferably about 60 Shore D or greater. For example, in one version, the inner cover has a Shore D hardness of about 55 to about 90 Shore D, or about 82 to about 99 Shore C. In another embodiment, the inner cover has a Shore D hardness of about 60 to about 78 Shore D, and in yet another version, the inner cover has a Shore D hardness of about 64 to about 72 Shore D. More particularly, in one example, the inner cover has a hardness of about 65 Shore D or greater. The hardness of the inner cover layer is measured per the methods described further below. In addition, the thickness of the inner cover layer is preferably about 0.015 inches to about 0.100 inches, more preferably about 0.020 inches to about 0.080 inches, and most preferably about 0.030 inches to about 0.050 inches. Typically, the thickness of the inner cover is about 0.035 or 0.040 or 0.045 inches.

Concerning the outer cover layer, this layer may be relatively thin. The outer cover preferably has a thickness within a range having a lower limit of 0.004 or 0.006 or 0.008 and an upper limit of 0.010 or 0.020 or 0.030 or 0.040 inches. Preferably, the thickness of the outer cover is about 0.016 inches or less, more preferably 0.008 inches or less. The outer cover preferably has a material hardness of 80 Shore D or less, or 70 Shore D or less, or 60 Shore D or less, or 55 Shore D or less, or 50 Shore D or less, or 45 Shore D or less. In one example, the outer cover preferably has a Shore D hardness in the range of about 50 to about 80, more preferably about 55 to about 75. In another example, the outer cover preferably has a Shore D hardness in the range of about 10 to about 70, more preferably about 15 to about 60. The hardness of the outer cover layer is measured per the methods described further below.

The hardness of a cover layer may be measured on the surface or midpoint of the given layer in a manner similar to measuring the hardness of a core layer as described further below. For example, the hardness of the inner cover layer may be measured at the surface or midpoint of the layer. A midpoint hardness measurement is preferably made for the inner and intermediate cover layers. The midpoint hardness of a cover layer is taken at a point equidistant from the inner surface and outer surface of the layer to be measured. Once one or more cover or other ball layers surround a layer of interest, the exact midpoint may be difficult to determine, therefore, for the purposes of the present invention, the measurement of "midpoint" hardness of a layer is taken within plus or minus 1 mm of the measured midpoint of the layer. A surface hardness measurement is preferably made for the outer cover layer. In these instances, the hardness is measured on the outer surface (cover) of the ball. Methods for measuring the hardness are described in detail below under "Test Methods."

The compositions used to make any cover layer (for example, inner, intermediate, or outer cover layer) may contain a wide variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

Golf balls made in accordance with this invention can be of any size, although the USGA requires that golf balls used in competition have a diameter of at least 1.68 inches. For play outside of USGA rules, the golf balls can be of a smaller size. Normally, golf balls are manufactured in accordance with USGA requirements and have a diameter in the range of about 1.68 to about 1.80 inches. There is no upper size limit so some golf balls, if desired, can be made having an overall diameter greater than 1.80 inches, for example, 1.90 or 2.10, or greater. Preferably, the golf ball diameter is about 1.68 to 1.74 inches, more preferably about 1.68 to 1.70 inches. In accordance with the present invention, the weight, diameter, and thickness of the core and cover layers may be adjusted, as needed, so the ball meets USGA specifications of a maximum weight of 1.62 ounces and a minimum diameter of at least 1.68 inches.

Manufacturing of Golf Balls

The inner core may be formed by any suitable technique including compression and injection molding methods. The outer core layer, which surrounds the inner core, is formed by molding compositions over the inner core. Compression or injection molding techniques may be used to form the other layers of the core assembly. Then, the cover layers are applied over the core assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball assembly (the core structure and any intermediate layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball sub-assembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Other Ball Constructions

It should be understood that the golf ball constructions described above are for illustrative purposes only, and they are not meant to be restrictive. Other golf ball constructions can be made in accordance with this invention.

EXAMPLES

The following prophetic examples describe golf ball constructions that can be made in accordance with this invention.

Example 1

A two-piece golf ball having an inner core and surrounding cover layer is made. Core Construction—a polybutadiene rubber composition is used to make the inner core having a diameter of about 1.560 inches. Outer Cover Construction—a composition comprising a blend of Na and Zn neutralized telechelic polycyclooctene ionomers is used to make the outer cover layer.

Example 2

A three-piece golf ball having an inner core and outer cover layer with an intermediate layer disposed between the core and cover layer is made. Core Construction—a polybutadiene rubber composition is used to make the inner core having a diameter of about 1.530 inches. Intermediate Layer Construction—a composition comprising a highly neutralized ionomer that comprises 30% of a magnesium neutralized telechelic polycyclooctene ionomer as a melt flow modifier is used to make the intermediate cover layer. Outer Cover Construction—a composition comprising a blend of Li and Na neutralized polyethylene methacrylic acid ionomers is used to make the outer cover layer.

Example 3

A two-piece golf ball having an inner core and surrounding cover layer is made. Core Construction—a composition comprising polybutadiene rubber, ZDA, ZnO, and up to 20% of a Zn neutralized telechelic polycyclooctene ionomer is used to make the inner core. Outer Cover Construction—a composition comprising a blend of Li and Na neutralized polyethylene methacrylic acid ionomers is used to make the outer cover layer.

Test Methods

Hardness.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements and is set to record the maximum hardness reading attained for each measurement. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used. Likewise, the midpoint of a core or cover layer is taken at a point equidistant from the inner surface and outer surface of the layer to be measured, for example an outer core layer or inner cover layer. Also, once one or more core layers surround a layer of interest, the exact midpoint may be difficult to determine, therefore, for the purposes of the present invention, the measurement of "midpoint" hardness of a layer is taken within plus or minus 1 mm of the measured midpoint of the layer.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression.

As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. The DCM is an apparatus that applies a load to a core or ball and measures the number of inches the core or ball is deflected at measured loads. A load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test.

Coefficient of Restitution ("COR").

The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR = V_{out}/V_{in} = T_{in}/T_{out}$).

It is understood that the compositions and golf ball products described and illustrated herein represent only some embodiments of the invention. It is appreciated by those skilled in the art that various changes and additions can be made to compositions and products without departing from the spirit and scope of this invention. It is intended that all such embodiments be covered by the appended claims.

We claim:

1. The A golf ball comprising:
   i) an inner core comprising a blend of: a) a telechelic ionomer and b) polybutadiene rubber; the inner core having an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient, wherein the telechelic ionomer is formed by reacting alkyl-cis-cyclooctene and cis-cyclooctene; and
   ii) an outer core layer comprising a thermoplastic or thermoset composition, the outer core layer being disposed about the inner core and having an outer surface hardness ($H_{outer\ surface\ of\ OC}$) and a midpoint hardness ($H_{midpoint\ of\ OC}$), the $H_{outer\ surface\ of\ OC}$ being greater than the $H_{midpoint\ of\ OC}$ to provide a positive hardness gradient; and
   iii) a cover having at least one layer.

2. The golf ball of claim 1, wherein the telechelic ionomer is present in an amount in the range of about 5 to about 50% by weight.

3. The golf ball of claim 1, wherein the outer core layer comprises a thermoset rubber composition and the rubber is selected from the group consisting of polybutadiene, polyisoprene, ethylene-propylene, ethylene-propylene-diene, styrene-butadiene, and, polyalkenamer rubbers, and mixtures thereof.

4. The golf ball of claim 1, wherein the outer core layer comprises a thermoplastic composition, the composition comprising an ethylene acid copolymer containing acid groups such that greater than 70% of the acid groups are neutralized.

5. The golf ball of claim 4, wherein the ethylene acid copolymer is selected from the group consisting of: ethylene/(meth)acrylic acid/n-butyl acrylate; ethylene/(meth)acrylic acid/ethyl acrylate; ethylene/(meth)acrylic acid/methyl acrylate; ethylene/(meth)acrylic acid/isobutyl acrylate; and ethylene/(meth)acrylic acid copolymers; and blends thereof.

6. The golf ball of claim 1, wherein the inner core has a diameter in the range of about 0.500 to about 1.500 inches; and wherein the $H_{inner\ core\ center}$ is in the range of about 10 Shore C to about 70 Shore C and the $H_{inner\ core\ surface}$ is in the range of about 15 Shore C to about 90 Shore C.

7. The golf ball of claim 1, wherein the $H_{midpoint\ of\ OC}$ is in the range of about 20 Shore C to about 85 Shore C and the $H_{outer\ surface\ of\ OC}$ is in the range of about 30 Shore C to about 95 Shore C.

8. The golf ball of claim 1, wherein the center hardness of the inner core ($H_{inner\ core\ center}$) is in the range of about 30 Shore C to about 65 Shore C and the outer surface hardness of the outer core layer ($H_{outer\ surface\ of\ OC}$) is in the range of about 40 Shore C to about 90 Shore C to provide a positive hardness gradient across the core assembly.

9. The golf ball of claim 1, wherein the ball has a compression in the range of about 25 to about 110.

* * * * *